US009766945B2

(12) United States Patent
Gaurav et al.

(10) Patent No.: US 9,766,945 B2
(45) Date of Patent: Sep. 19, 2017

(54) VIRTUAL RESOURCE SCHEDULING FOR CONTAINERS WITH MIGRATION

(71) Applicant: VMWARE, INC., Palo Alto, CA (US)

(72) Inventors: Kumar Gaurav, Bangalore (IN); Anne Holler, Palo Alto, CA (US); Vaibhav Kohli, Bangalore (IN); Shruti Sharma, Bangalore (IN); Anil Kumar, Pune (IN); Rajdeep Dua, Bangalore (IN)

(73) Assignee: WMware, Inc., Palo Alto, CA (US)

( * ) Notice: Subject to any disclaimer, the term of this patent is extended or adjusted under 35 U.S.C. 154(b) by 103 days.

(21) Appl. No.: 14/835,758

(22) Filed: Aug. 26, 2015

(65) Prior Publication Data
US 2016/0378563 A1 Dec. 29, 2016

(30) Foreign Application Priority Data

Jun. 25, 2015 (IN) .......................... 3199/CHE/2015

(51) Int. Cl.
G06F 9/50 (2006.01)
G06F 9/455 (2006.01)
G06F 9/48 (2006.01)

(52) U.S. Cl.
CPC ........ *G06F 9/5077* (2013.01); *G06F 9/45558* (2013.01); *G06F 9/4856* (2013.01); *G06F 2009/4557* (2013.01)

(58) Field of Classification Search
None
See application file for complete search history.

(56) References Cited

U.S. PATENT DOCUMENTS

| 2009/0007099 | A1* | 1/2009 | Cummings | G06F 9/45558 718/1 |
| 2010/0169536 | A1* | 7/2010 | Shedel | G06F 9/45558 711/6 |
| 2014/0026133 | A1* | 1/2014 | Parker | G06F 9/5083 718/1 |

* cited by examiner

Primary Examiner — Gregory A Kessler

(57) ABSTRACT

A method for scheduling computing resources with container migration includes determining a resource availability for one or more hosts, a resource allocation for one or more virtual machines (VMs), and a resource usage for one or more containers. The method includes identifying the hosts on which VMs and containers can be consolidated based on resource availability. The method also includes calculating a target resource configuration for one or more VMs. The method further includes removing or adding resources to the VMs for which a target resource configuration was calculated to achieve the target resource configuration. The method further includes allocating the one or more VMs on the one or more hosts based on the resource availability of the one or more hosts, and allocating the one or more containers on the one or more VMs based on the resource configuration of each VM and the resource usage of each container.

20 Claims, 5 Drawing Sheets

VIRTUAL RESOURCE SCHEDULING FOR CONTAINERS WITH MIGRATION

RELATED APPLICATIONS

Benefit is claimed under 35 U.S.C. 119(a)-(d) to Foreign application Serial No. 3199/CHE/2015 filed in India entitled "VIRTUAL RESOURCE SCHEDULING FOR CONTAINERS WITH MIGRATION", on Jun. 25, 2015, by VMware, Inc., which is herein incorporated in its entirety by reference for all purposes.

This application is related to application Ser. No. 14/983,544, filed concurrently herewith, entitled "Virtual Resource Scheduling for Containers without Migration."

BACKGROUND

Containerization technology is becoming popular among developers and information technology administrators. Containers and virtual machines can co-exist as parent-child, as siblings, or as child-parent relationships. With containers hosted on virtual machines (VMs), virtual machines form a ubiquitous and elastic fabric for hosting a container cloud. Application code may then run on a nested virtualization stack, which requires resource optimization and tuning for performance gain in each layer. With containers also capable of migration (live or offline), another level of complexity is added to the optimization problem.

If resources are not correctly allocated, resources in a datacenter may be wasted. As containers are started and shut down on various VMs, some VMs may end up with more resources than necessary for their assigned containers, while other VMs become over-committed, with not enough resources. Resources may therefore be wasted if the containers and VMs are not properly optimized.

SUMMARY

One or more embodiments provide techniques for scheduling distributed resources in a container cloud running on virtual infrastructure. A method for scheduling computing resources includes determining a resource availability for one or more hosts, a resource allocation for one or more virtual machines (VMs), and a resource usage for one or more containers. The method further includes identifying the one or more hosts on which VMs and containers can be consolidated based on the resource availability. The method also includes calculating a target resource configuration for one or more VMs. The method further includes removing or adding resources to each of the one or more VMs for which a target resource configuration was calculated to achieve the target resource configuration for each VM. The method further includes allocating the one or more VMs on the one or more hosts based on the resource availability of the one or more hosts, and allocating the one or more containers on the one or more VMs based on the resource configuration of each VM and the resource usage of each container.

Further embodiments include a non-transitory computer-readable storage medium comprising instructions that cause a computer system to carry out the above method.

DETAILED DESCRIPTION

Embodiments provide a method of scheduling computing resources in a container cloud running on virtual infrastructure that supports migration of containers. Resources can be optimized across layers by the algorithms described below. Embodiments described herein reduce wastage of underlying physical resources in a datacenter.

Figure 1:
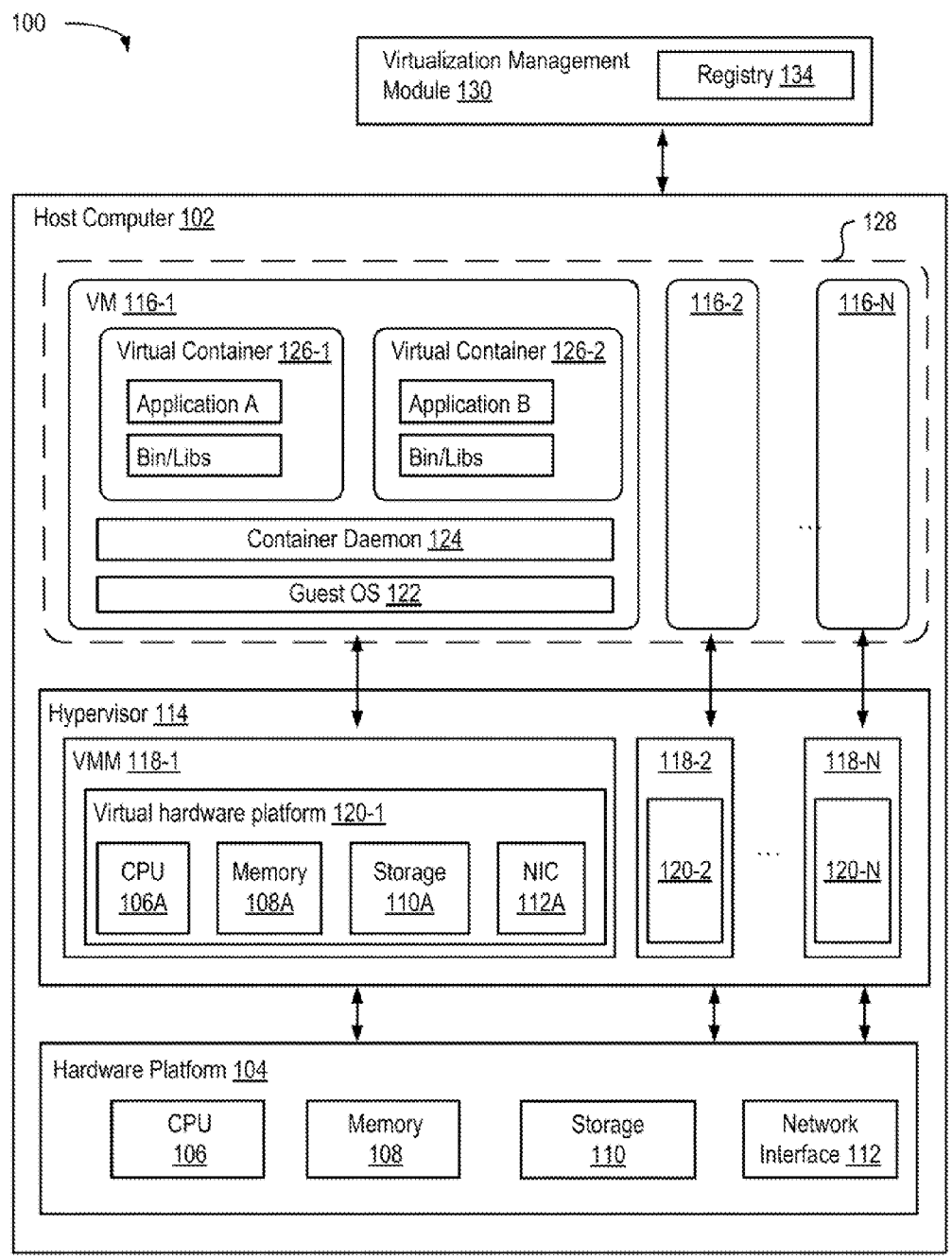
FIG. 1 is a block diagram that illustrates a computing system in accordance with one embodiment.

FIG. 1 is a block diagram that illustrates a computing system 100 with which one or more embodiments of the present disclosure may be utilized. As illustrated, computing system 100 includes at least one host computer 102. Although a single host is depicted in FIG. 1, it is recognized that computing system 100 may include a plurality of host computers 102, which can be arranged in an interconnected server system such as a data center.

Host 102 is configured to provide a virtualization layer that abstracts computing resources of a hardware platform 104 into multiple virtual machines (VMs) 116 that run concurrently on the same host 102. Hardware platform 104 of host 102 includes CPU 106, memory 108, storage 110, networking interface 112, and other conventional components of a computing device. VMs 116 run on top of a software interface layer, referred to herein as a hypervisor 114, that enables sharing of the hardware resources of host 102 by the virtual machines. One example of hypervisor 114 that may be used in an embodiment described herein is a VMware ESXi™ hypervisor provided as part of the VMware vSphere® solution made commercially available from VMware, Inc of Palo Alto, Calif. Hypervisor 114 provides a device driver layer configured to map physical resource of hardware platforms 104 to "virtual" resources of each VM 116 such that each VM 116-1 to 116-N has its own corresponding virtual hardware platform (e.g., a corresponding one of virtual hardware platforms 120-1 to 120-N). Each such virtual hardware platform 120 provides emulated hardware (e.g., memory 108A, processor 106A, storage 110A, network interface 112A, etc.) that may, for example, function as an equivalent, conventional hardware architecture for its corresponding VM 116. Virtual hardware platforms 120-1 to 120-N may be considered part of virtual machine monitors (VMMs) 118-1 to 118-N which implement virtual system support to coordinate operations between hypervisor 114 and corresponding VMs 116-1 to 116-N in the pool of VMs 128.

Hypervisor 114 may run on top of a host operating system of host 102 or directly on hardware components of host 102. Each VM 116 includes a guest operating system 122 (e.g., Microsoft Windows®, Linux™) and one or more guest applications and processes running on top of guest operating system 122.

In one or more embodiments, each VM 116 includes a container daemon 124 installed therein and running as a guest application under control of guest OS 122. Container daemon 124 is a process that enables the deployment and management of virtual instances (referred to interchangeably herein as "containers" or "virtual containers") by providing a layer of operating-system-level virtualization on guest OS 122 within VM 116. Containers 126 are software instances that enable virtualization at the operating system level. That is, with containerization, the kernel of an operating system that manages a host computer is configured to provide multiple isolated user space instances. These instances, referred to as containers, appear as unique servers from the standpoint of an end user that communicates with the containers. However, from the standpoint of the operating system that manages the host computer on which the containers execute, the containers are user processes that are scheduled and dispatched by the operating system. Examples of a container daemon include the open-source Docker platform made available by Docker, Inc. and Linux Containers (LXC).

Computing system 100 includes virtualization management module 130 that may communicate with the one or more hosts 102. Virtualization management module 130 is configured to carry out administrative tasks for the computing system 100, including managing hosts 102, managing VMs running within each host 102, provisioning VMs, migrating VMs from one host to another host, and load balancing between hosts 102. In one embodiment, virtualization management module 130 is a computer program that resides and executes in a central server, which may reside in computing system 100, or alternatively, running as a VM in one of hosts 102. One example of virtualization management module 130 is the vCenter Server® product made available from VMware. Inc.

In one or more embodiments, virtualization management module 130 is configured to perform resource management for virtual containers 126 in a virtualized environment. Virtualization management module 130 may create a virtual infrastructure by instantiating a packaged group (or pool 128) of a plurality of VMs 116 having container daemons 124 installed therein. Virtualization management module 130 is configured to interact with container daemons 124 installed on each of the VMs to deploy, update, or remove instances of containers on each of the VMs. Virtualization management module 130 is configured to maintain a registry 134 that tracks location, status, and other metadata of each virtual container instance executing in the plurality of VMs 116.

By implementing containers on virtual machines in accordance with embodiments described herein, response time may be improved as booting a container is generally faster than booting a VM. All containers in a VM run on a single OS kernel, thereby fully utilizing and sharing CPU, memory, I/O controller, and network bandwidth of the host VM. Containers also have smaller footprints than VMs, thus improving density. Storage space can also be saved, as the container uses a mounted shared file system on the host kernel, and does not create duplicate system files from the parent OS.

From an application point of view, there are more added benefits to the embodiments described herein. If an application is spread across VMs (for example, in the case of multi-tier applications), taking an application snapshot may be difficult since snapshots for all VMs have to be taken at exactly the same global time instant. In the case of containers, this problem is simplified since a snapshot is taken of the host VM itself which thereby has snapshots of all running containers.

If an application is spread as containers on a single host VM, it can be migrated to another host easily (such as with VMware vMotion). Hot remove of CPU/memory resources may also be available for containers. Additionally, if security of one container has been compromised, other containers may be unaffected.

Implementing containers on virtual machines also provides ease of upgrade. Since an entire application is hosted on host VM(s), upgrade of the application of the OS/security patch becomes easier. Only the VM has to be patched, and all containers deployed on a host can enjoy benefits of the patch upgrade since the containers share the same host kernel space. In addition, containers can be quickly created on a host VM after hotplug of vCPUs and hot add of memory.

In a virtual infrastructure hosting containers, embodiments described herein optimize hardware resources by providing a correct resource allocation to host VMs by looking at the consumption of containers. Ideal placement of host VMs in a server farm allows for better consolidation. Embodiments also maintain the ideal number and OS flavor of host VMs needed such that all container guest OSes are supported. Embodiments also provide ideal placement and migration of the containers across host VMs for better consolidation. Embodiments described herein reduce wastage of underlying physical resources in a datacenter. The optimizations described below may be performed on a regular basis, such as optimizing with a periodically run background job, or may be performed responsive to user input, for example from a system administrator.

FIGS. 2-7 are block diagrams depicting states of, and management operations performed on, a datacenter, according to embodiments of the present disclosure. The datacenter may include a plurality of hosts 202 (similar to hosts 102) executing one or more VMs 230 (similar to VMs 116), each VM 230 configured to execute one or more containers 240 (similar to containers 126). Boxes in FIGS. 2-7 represent resources associated with the corresponding layer within the virtualized computing system. For example, each box for a host 202 represents an amount of physical computing resources (e.g., memory) available on a host 202; each box for VMs 230 represents an amount of computing resources (e.g., memory) configured for each VM 230; and each box for containers 240 represents an amount of computing resources utilized by or reserved for each container 240 (i.e., max(utilization, limit)). Other resources may be optimized instead of, or in addition to, memory. All units are in GB in FIGS. 2-7.

Figure 2:
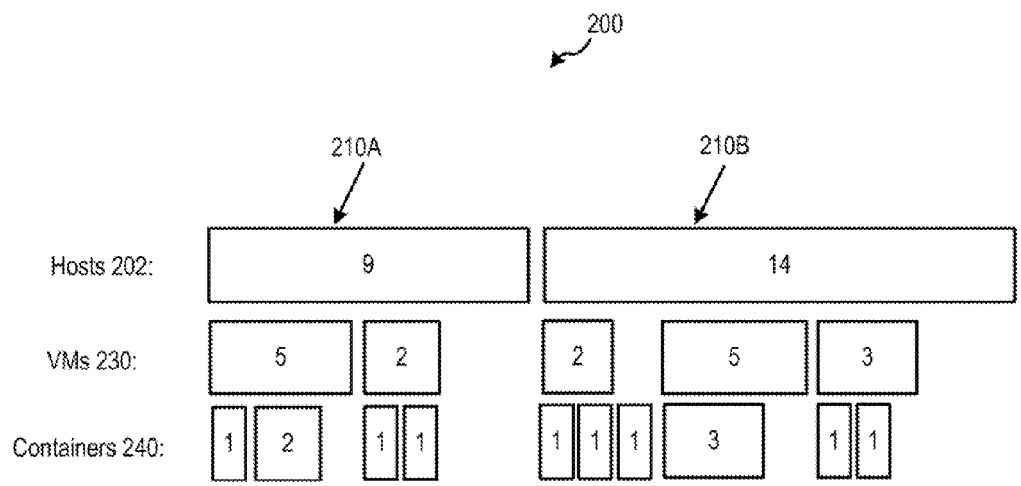
FIG. 2 illustrates an example state of a datacenter according to an embodiment.

FIG. 2 illustrates an example initial state 200 of a datacenter. The state 200 of FIG. 2 illustrates two hosts: host 210A having 9 GB of available memory and host 210B having 14 GB of available physical memory. FIG. 2 also illustrates various VMs 230 configured for 5 GB and 2 GB of memory, respectively, on host 210A and VMs configured for 2 GB, 5 GB, and 3 GB of memory on host 210B. Containers 240 are also illustrated on the VMs and hosts with their sizes shown as well.

Gaps in the size of the VMs and the demand from containers can happen over time as containers start up and get shut down. Similarly, there may be cases of overcommit if more containers are started on a given VM and swap memory is being used. In the representations depicted in FIGS. 2-7, a VM's demand is approximated as a sum of containers' memory usage plus guest OS memory usage. The memory footprint of guest OS is generally static and is ignored here for purposes of illustration.

As seen in this state 200 of the datacenter, some VMs have more resources than necessary for their containers while one VM is overcommitted. For example, a VM on host 210A having 5 GB has a 1 GB container and a 2 GB container running (i.e., 3 GB total) therein, while a VM on host 210B having 2 GB of memory has to execute three 1 GB containers in a case of overcommitment.

Figure 3:
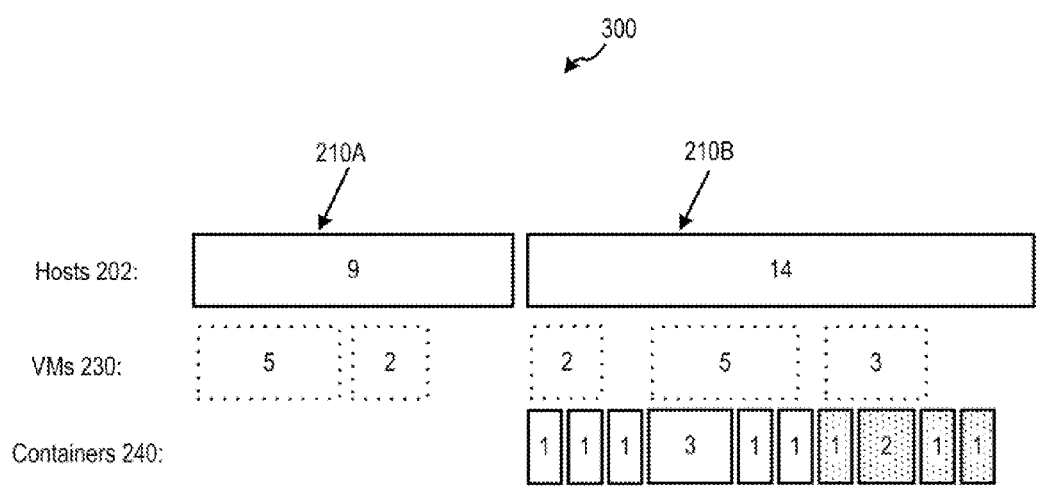
FIGS. 3-7 illustrate other example states of a datacenter according to embodiments of the present disclosure.

FIG. 3 illustrates a first step where an "imaginary" state of the data center is determined from the perspective of containers 240 and hosts 202, i.e., disregarding the VMs 230. As such, VMs 230 are depicted in dashed outline. In one embodiment, the system determines how to consolidate containers on fewer hosts. As shown, the total resource usage of the containers across both hosts 210A and 210B is 13 GB (1+2+1+1+1+1+1+3+1+1). Because host 210B has available resources of 14 GB, it is determined that all containers can fit on host 210B. Containers that were from host 210A (e.g., having sizes 1, 2, 1, 1) and now imagined on host 210B are depicted with a dotted fill pattern. This "imaginary" state 300 is illustrated in FIG. 3.

Figure 4:
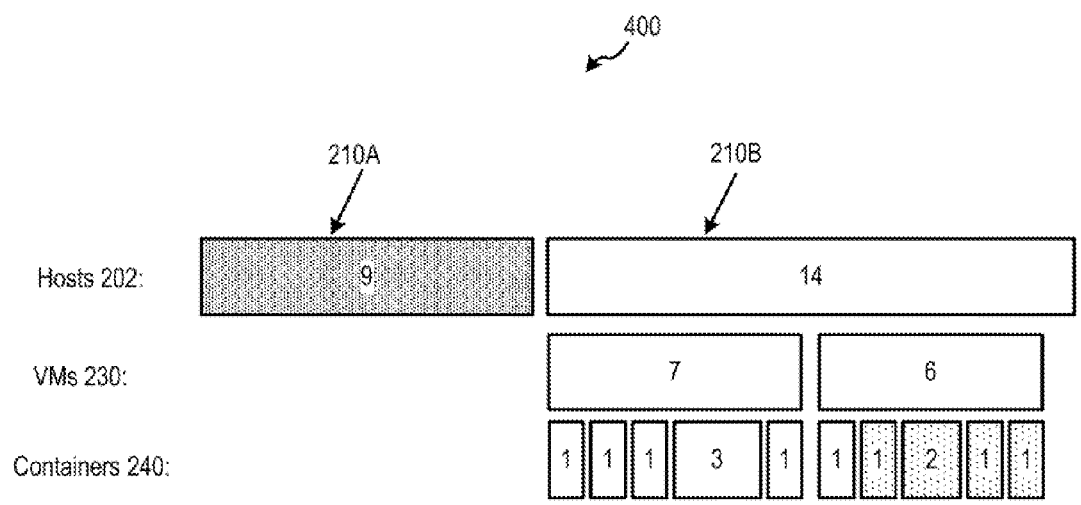

FIG. 4 illustrates a second step 400, where imaginary or "prospective" VMs 230 (having sizes 7 and 6) executing on host 210B are proposed to host containers 240. The size of the imaginary VMs 230 can be chosen to be any size. However, the system should track the guest OS flavors across the containers 240, and therefore a minimal count of host VMs 230 is the count of distinct OS flavors across the containers 240. That is, as a form of operating system virtualization, different containers may be limited to a particular operating system (or "flavor") on which to execute as instances. Generally, a good practice is to keep the host VMs as large as possible, within a threshold. As a result of this visualization, host 210A is now free and can be powered off or used for other purposes, which is depicted with a shaded fill pattern in FIG. 4.

The visualization in FIG. 4 is an ideal state and appears simple and elegant, but may still have practical problems to be solved. For example, containers might not be able to move from one host 210 to another without its VM being migrated from one host to another first. So, a first step is to modify the VMs to a proposed size calculated to accommodate containers 240 (i.e., right-sizing the VMs).

Figure 5:
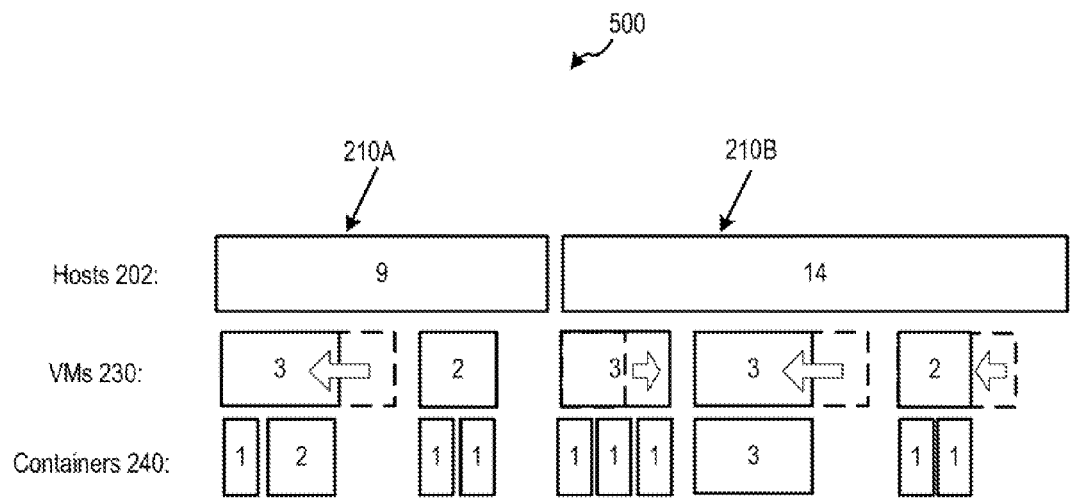

FIG. 5 illustrates a state 500, where VMs 230 are right-sized by adding or removing resources. As shown, the left-most VM 230 initially had a size of 5, but now has a size of 3 as its containers utilize 3 GB of resources. Other VMs 230 are similarly adjusted, as illustrated in FIG. 5.

Figure 6:
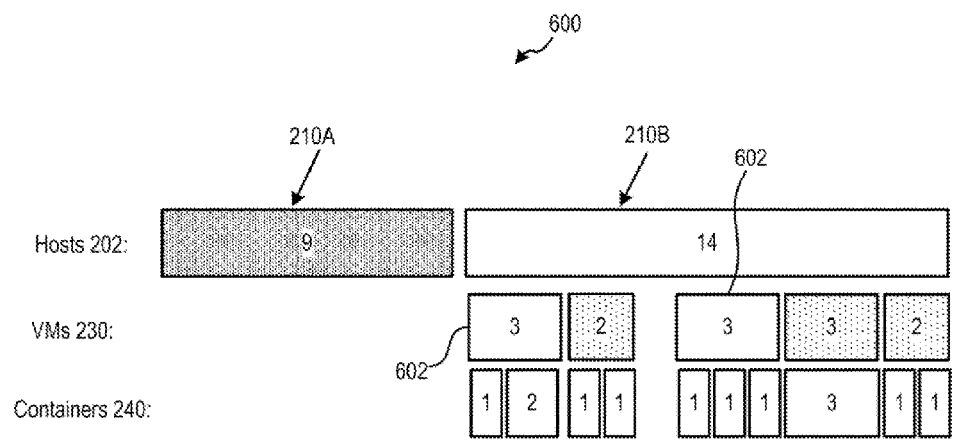

FIG. 6 illustrates a state 600 where VMs 230 have been migrated across hosts (in this case, from host 210A to host 210B). This frees up the extra physical host 210A to be powered off, placed in a low power state, or used for other purposes. In some embodiments, a VMware DRS/DPM® algorithm may be used to automatically migrate the VMs around for better consolidation, and for freeing up hosts.

First, across the physical machines, a few VMs 602 are identified which will be the eventual target container hosts such that all container OS flavors are represented by at least one VM guest OS. In the embodiment depicted, the non-selected VMs have been depicted in a shaded fill.

Figure 7:
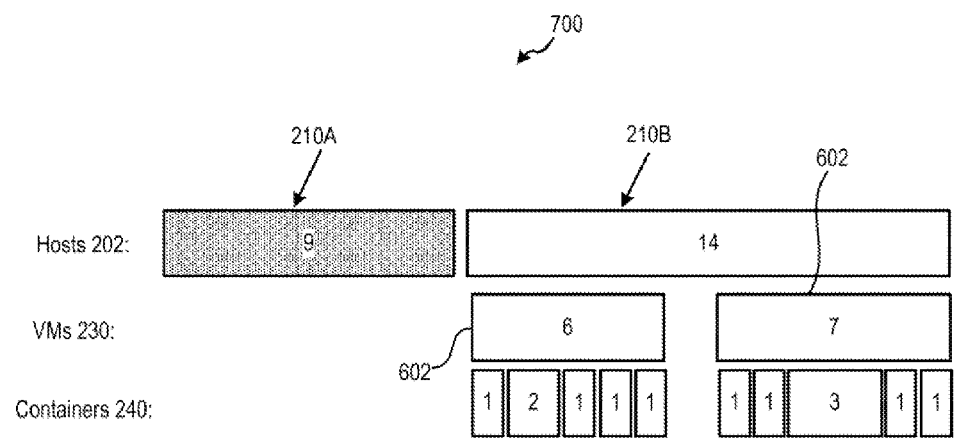

FIG. 7 illustrates a final state 700 of this example embodiment. Once particular VMs 602 have been identified, the selected VMs 602 can be expanded incrementally adding computing resources (e.g., by memory "hot add" or CPU "hot plug"), as necessary. As shown in FIG. 7, VMs 602 have been increased to resource sizes 6 and 7, respectively. Containers 240 can then be migrated to these appropriate VMs from other VMs, one by one, while repeating incremental expansion. In addition, the VMs 230 without any containers 240 can then be brought down. The result is illustrated as state 700.

A general solution algorithm is described in detail below. This solution can be applied in conjunction with the examples described above in FIGS. 1-7

Figure 8:
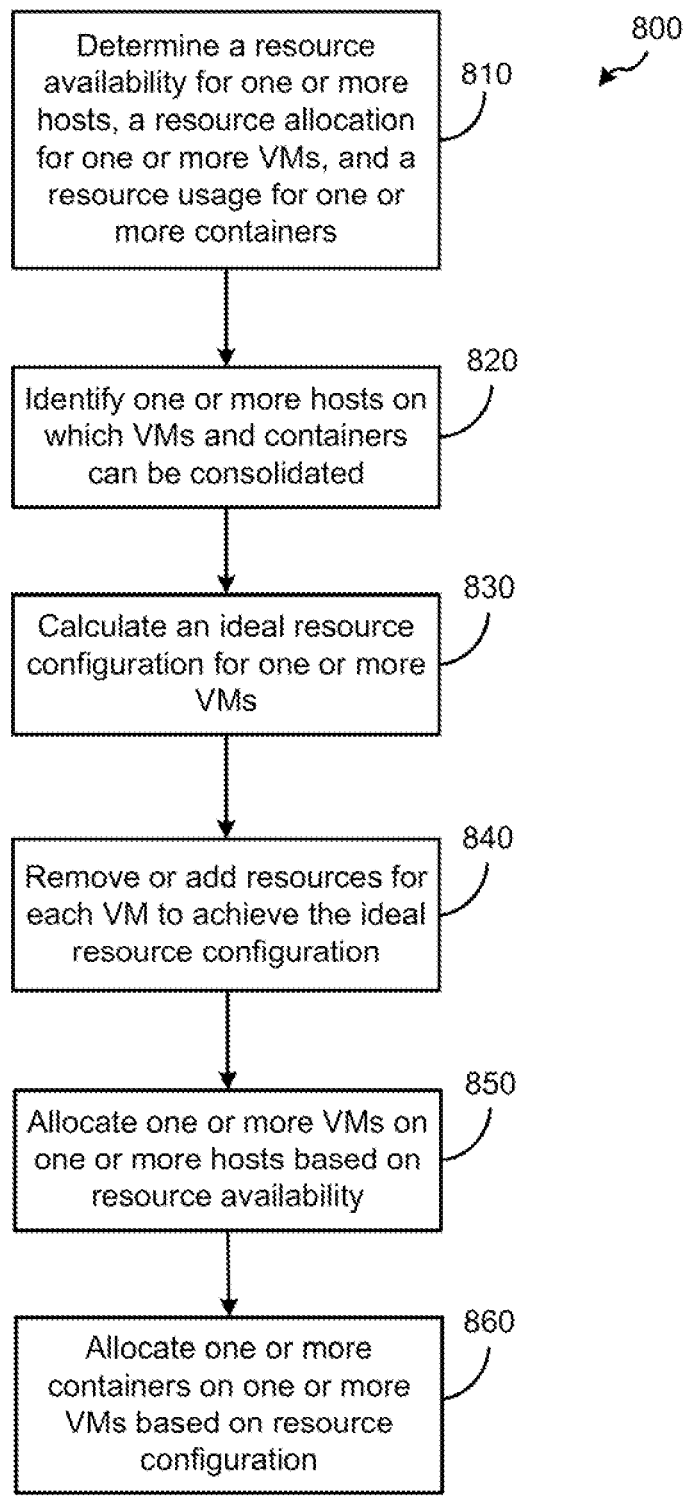
FIG. 8 is a flow diagram that illustrates a method of scheduling resources.

FIG. 8 is a flow diagram that illustrates a method 800 of scheduling resources, according to an embodiment of the present disclosure. First, at step 810, virtualization management module 130 determines resource availability for one or more hosts 102, a resource allocation for one or more VMs 116, and a resource usage for one or more containers 126. In some embodiments, virtualization management module 130 may build a tree from the relationships between hosts and VMs (i.e., "(host,VMs)") and relationships between VMs and containers (i.e., "(VM,Containers)"). In one implementation, virtualization management module 130 may query its registry 134 to retrieve relationships between hosts and VMs (e.g., via an API or command line interface). Virtualization management module 130 may further query each container daemon 124 running on each VM 116 to generate relationships between that VM 116 and containers running therein (e.g., via an API or command line interface exposed by container daemon 124). In some embodiments, virtualization management module 130 may shut down (or otherwise suspend, kill, pause, etc.) any VMs which do not host any containers 126 VM based on the generated relationship information.

In some embodiments, for each entity (hosts, VMs, and containers), virtualization management module 130 fetches memory data. Memory configuration is fetched for each host, memory allocation and usage is fetched for each VM, and memory usage and limit is fetched for each container. The memory data may be retrieved using similar techniques used to retrieve relationship data. e.g., APIs and CLIs.

At step 820, virtualization management module 130 identifies the one or more hosts on which VMs and containers can be consolidated based on the resource availability. In some embodiments, virtualization management module 130 may first generate a sorted list of the hosts as per free memory available, i.e. $\{H_1, H_2, \ldots H_n\}$. Second, virtualization management module 130 sums up all containers' memory usage: $C=(1+\delta)*\Sigma mem(C_i)$, where $\delta=$a small grace factor for inaccuracy in memory statistics (e.g., 0.1). Third, virtualization management module 130 partitions the list of hosts as $\{H_1, H_2, \ldots H_k\}$ $\{H_{k+1}, \ldots H_n\}$ such that the sum of memory configuration of hosts $H_1$ to $H_k$ is just enough to host all containers, i.e., $\Sigma_{i=1}^{k}=mem(H_i) > C > \Sigma_{i=1}^{k-1} mem(H_i)$. In other words, virtualization management module 130 generates a first list of hosts $\{H_1, H_2, \ldots H_k\}$ to which all VMs will be live-migrated and a second list of VMs $\{H_{k+1}, \ldots H_n\}$ which will be powered off.

Next, at step 830, virtualization management module 130 calculates an ideal resource configuration for one or more VMs. At step 840, virtualization management module 130 removes or adds resources to each of the one or more VMs for which an ideal resource configuration was calculated to achieve the ideal resource configuration for each VM.

In one or more embodiments, for each VM, the ideal memory configuration may be calculated according to Equation (1).

$$VM\_ideal=\eta+(1+\delta)*\Sigma mem(Ci) \qquad \text{Equation (1)}$$

where $\eta=$memory utilization by the VM's OS and container engine (generally, 1 GB or so), mem(Ci)=max(memory utilization, memory limit) of the $i^{th}$ container running on this VM, and $\delta=$a small grace factor for inaccuracy in memory statistics (typically 0.1). VM_ideal is neither equal to demand nor equal to usage in any sense. Rather, this term is an upper limit of demand coming from the underlying containers. The memory configuration may also comprise a prospective or target configuration in some embodiments, and not necessary an "ideal" configuration.

For each VM, virtualization management module 130 compares the VM's memory allocation (mem_alloc) to the VM's corresponding "ideal" memory configuration (mem_ideal) and modifies the resource configuration based on how large a difference the allocation and configuration are. In cases where the ideal memory configuration (mem_ideal) is within a first range, for example, in the range (0, (1−µ$_1$)* mem_alloc), where µ$_1$ is typically 0.5 or so, virtualization management module 130 dynamically removes memory from this VM to reset memory to mem_alloc (hot remove). In some embodiments (for example where dynamically removal is not supported), an alert may be provided to a system administrator to power off the VM and then remove memory from the VM, and then restart containers on the VM.

In cases where the ideal memory configuration (mem_ideal) is within a second range, for example, in the range ((1−µ$_1$)*mem_alloc, (1+µ$_2$)*mem_alloc), where µ$_2$ is typically 0.2, virtualization management module 130 may characterize this VM has being more or less correct in size, i.e., where mem_ideal is substantially similar to mem_alloc. In such cases, virtualization management module 130 may do nothing and skip to the next VM.

In cases where the ideal memory configuration (mem_ideal) is greater than a threshold value, for example, more than (1+µ$_2$)*mem_alloc, virtualization management module 130 dynamically adds memory to this VM to reset memory to mem_ideal. In embodiments where dynamically addition of memory (i.e., hot add) is not supported, virtualization management module 130 may generate an alert to a system administrator or user to power off the VM and then add memory to the VM, and then restart containers on the VM.

At step 850, virtualization management module 130 allocates the one or more VMs on the one or more hosts based on the resource availability of the one or more hosts. In some embodiments, virtualization management module 130 next sort the VMs in {H$_{k+1}$, ... H$_n$} as per descending order of memory utilization. Assume, for example, the set is {VM$_1$, VM$_2$, ... VM$_m$}. Then, virtualization management module 130 distributes these VMs into the set {H$_1$, H$_2$, ... H$_k$} according to a best fit algorithm (or other distribution algorithm) by live migration, one by one. A greedy algorithm may be used. For example, VM is live migrated to the host with largest spare capacity H$_j$. Now, hosts {H$_{k+1}$, ... H$_n$} can be powered off or taken for some other purpose, since no VMs are running on those hosts.

At step 860, virtualization management module 130 allocates the one or more containers on the one or more VMs based on the resource configuration of each VM and the resource usage of each container. In some embodiments, on each physical host H$_i$, virtualization management module 130 identifies a number (i.e., x) of VMs {VM$_1$, ... VM$_x$} which will be the eventual target container hosts such that the VMs are the largest (by free resources), and the set represents all container OS flavors. Other VMs will be deleted after container migration. Here, x=ceil (size of host mem/threshold size of VMs).

For each VM in the remaining set (VM$_{x+1}$, ... VM$_y$):
(a) for each Container {C$_1$, ... C$_z$} in that VM (arranged in ascending order of memory utilization), virtualization management module 130 migrates Container C$_i$ to the smallest VM$_j$ in set {VM$_1$, ... VM$_x$} which has a matching OS flavor. In some embodiments, virtualization management module 130 dynamically adds (i.e., hot add) memory to VMj by an amount equal to the utilization of Container Ci.
(b) Delete that VM.

This step utilizes container migration support. Live migration of containers may be used if supported. In embodiments where live migration is not supported, virtualization management module 130 may instead perform checkpoint/restore on the container as an alternative. In some cases, if the container is a stateless node of an application cluster, it can be stopped (killed) on the source VM and restarted on a target VM pointing to the same disk image Finally, the steps above can be repeated after every periodic interval (such as 24 hours, or when a threshold number of containers have been provisioned or deleted).

Note that the above solution does not necessarily aim for global optimization of all containers and the VMs in terms of final placement, since doing so might require multiple live migrations of individual VMs and container. Rather, the solution optimizes for minimum cost of migration, even while compromising slightly on the final placement of VMs and containers.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. Containers implement operating system-level virtualization, wherein an abstraction layer is provided on top of the kernel of an operating system on a host computer. The abstraction layer supports multiple containers each including an application and its dependencies. Containers may run as isolated processes in user space on the host operating system and share the kernel with other containers. While multiple containers can share the kernel, each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

The invention claimed is:

1. A method for scheduling computing resources, comprising:
   determining a resource availability for one or more hosts, a resource allocation for one or more virtual machines (VMs), and a resource usage for one or more containers;
   identifying the one or more hosts on which VMs and containers can be consolidated based on the resource availability;
   calculating a target resource configuration for one or more VMs;
   removing or adding resources to each of the one or more VMs for which a target resource configuration was calculated to achieve the target resource configuration for each VM;
   allocating the one or more VMs on the one or more hosts based on the resource availability of the one or more hosts; and
   allocating the one or more containers to be executed in the one or more VMs based on the resource configuration of each VM and the resource usage of each container.

2. The method of claim 1, wherein the resource is memory.

3. The method of claim 1, wherein determining a resource usage for one or more containers further comprises summing a resource usage for each container and adding a grace factor.

4. The method of claim 1, wherein calculating a target resource configuration further comprises determining an upper limit of resource demand on a VM from one or more containers.

5. The method of claim 1, wherein identifying the one or more hosts on which VMs and containers can be consolidated based on the resource availability further comprises identifying hosts with enough resources to host the one or more containers.

6. The method of claim 1, wherein adding resources to a VM further comprises a hot add of resources to the VM.

7. The method of claim 1, wherein allocating the one or more containers on the one or more VMs further comprises migrating a container to a VM that has a matching operating system (OS) by:
   performing a live migration of the container;
   performing a checkpoint/restore operation on the container; or
   killing and restarting the container.

8. A non-transitory computer-readable storage medium containing a program which, when executed by one or more processors, performs operations for scheduling computing resources, the operations comprising:
   determining a resource availability for one or more hosts, a resource allocation for one or more virtual machines (VMs), and a resource usage for one or more containers;
   identifying the one or more hosts on which VMs and containers can be consolidated based on the resource availability;
   calculating a target resource configuration for one or more VMs;
   removing or adding resources to each of the one or more VMs for which a target resource configuration was calculated to achieve the target resource configuration for each VM;
   allocating the one or more VMs on the one or more hosts based on the resource availability of the one or more hosts; and
   allocating the one or more containers to be executed in the one or more VMs based on the resource configuration of each VM and the resource usage of each container.

9. The non-transitory computer-readable storage medium of claim 8, wherein the resource is memory.

10. The non-transitory computer-readable storage medium of claim 8, wherein determining a resource usage for one or more containers further comprises summing a resource usage for each container and adding a grace factor.

11. The non-transitory computer-readable storage medium of claim 8, wherein calculating a target resource configuration further comprises determining an upper limit of resource demand on a VM from one or more containers.

12. The non-transitory computer-readable storage medium of claim 8, wherein identifying the one or more hosts on which VMs and containers can be consolidated based on the resource availability further comprises identifying hosts with enough resources to host the one or more containers.

13. The non-transitory computer-readable storage medium of claim 8, wherein adding resources to a VM further comprises a hot add of resources to the VM.

14. The non-transitory computer-readable storage medium of claim 8, wherein allocating the one or more containers on the one or more VMs further comprises migrating a container to a VM that has a matching operating system (OS) by:
performing a live migration of the container;
performing a checkpoint/restore operation on the container; or
killing and restarting the container.

15. A system, comprising:
a processor; and
a memory, wherein the memory includes a program executable in the processor to perform operations for scheduling computing resources, the operations comprising:
determining a resource availability for one or more hosts, a resource allocation for one or more virtual machines (VMs), and a resource usage for one or more containers;
identifying the one or more hosts on which VMs and containers can be consolidated based on the resource availability;
calculating a target resource configuration for one or more VMs;
removing or adding resources to each of the one or more VMs for which a target resource configuration was calculated to achieve the target resource configuration for each VM;
allocating the one or more VMs on the one or more hosts based on the resource availability of the one or more hosts; and
allocating the one or more containers to be executed in the one or more VMs based on the resource configuration of each VM and the resource usage of each container.

16. The system of claim 15, wherein the resource is memory.

17. The system of claim 15, wherein determining a resource usage for one or more containers further comprises summing a resource usage for each container and adding a grace factor.

18. The system of claim 15, wherein calculating a target resource configuration further comprises determining an upper limit of resource demand on a VM from one or more containers.

19. The system of claim 15, wherein adding resources to a VM further comprises a hot add of resources to the VM.

20. The system of claim 15, wherein allocating the one or more containers on the one or more VMs further comprises migrating a container to a VM that has a matching operating system (OS) by:
performing a live migration of the container;
performing a checkpoint/restore operation on the container; or
killing and restarting the container.

* * * * *